United States Patent
Jiang (10) Patent No.: US 8,271,762 B2
(45) Date of Patent: Sep. 18, 2012

(54) MAPPING MANAGEMENT METHODS AND SYSTEMS

(75) Inventor: Pei-Jun Jiang, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 714 days.

(21) Appl. No.: 12/176,444

(22) Filed: Jul. 21, 2008

(65) Prior Publication Data

US 2009/0228679 A1 Sep. 10, 2009

(30) Foreign Application Priority Data

Mar. 7, 2008 (CN) .......................... 2008 1 0007760

(51) Int. Cl.
*G06F 13/00* (2006.01)
*G06F 13/28* (2006.01)
*G06F 9/26* (2006.01)
*G06F 9/34* (2006.01)

(52) U.S. Cl. . 711/202; 711/209; 711/103; 711/E12.008; 711/E12.014

(58) Field of Classification Search ........................ None
See application file for complete search history.

(56) References Cited

U.S. PATENT DOCUMENTS

| 2008/0189490 A1* | 8/2008 | Cheon et al. ................... 711/144 |
| 2009/0070547 A1* | 3/2009 | Jeong et al. .................... 711/209 |
| 2009/0150646 A1* | 6/2009 | Allen et al. .................... 711/213 |

OTHER PUBLICATIONS

IBM, "A Guide to the IBM System/370 Model 168", Jun. 1975, IBM Corp. Technical Publications, Third Edition, pp. 56-64.*

* cited by examiner

*Primary Examiner* — Charles Rones
*Assistant Examiner* — Eric S Cardwell
(74) *Attorney, Agent, or Firm* — Thomas|Kayden (57) ABSTRACT

Mapping management methods and systems are provided. First, a sub-read command comprising mapping directory number, block offset and page offset is obtained. Then, a specific block mapping table is located from a plurality of block mapping tables according to the mapping directory number, and a first specific entry is located from the specific block mapping table according to the block offset, wherein the first specific entry comprises a mapping mode setting and block information. When the mapping mode setting is a page mapping mode, a second specific entry is located from a page mapped block table according to the block information, and a page mapping table is located corresponding to a specific page mapped block. Thereafter, a third specific entry is located from the page mapping table according to the page offset, and a page of data is located from a storage unit according to the third specific entry.

22 Claims, 6 Drawing Sheets

| MDN | BO | PO | DN | SO |

MAPPING MANAGEMENT METHODS AND SYSTEMS

CROSS REFERENCE TO RELATED APPILCATIONS

This Application claims priority of China Patent Application No. 200810007760.X, filed on Mar. 7, 2008, the entirety of which is incorporated by reference herein.

BACKGROUND OF THE INVENTION

1. Field of the Invention

The disclosure relates generally to mapping management methods and systems, and, more particularly to mapping management methods and systems adapted to non-volatile memory that integrate a block mapping mode and a page mapping mode.

2. Description of the Related Art

Non-volatile memory, like Flash memory, is widely used nowadays and it is characterized that the unit for read/write is a page, and the unit for erase is a block, and the data must be erased before write. The characteristic makes it difficult to manage the read and write commands with Logic Block Address (LBA) from the host or the applications and to translate the logic addresses into physical addresses to access the physical block of the non-volatile memory. Therefore, a translation layer is always used between the file system of the host and the non-volatile memory to manage the read and write commands from the host and to access data in the memory. In conventional storage management for a non-volatile memory, data is accessed and addressed using a page mapping mode, a block mapping mode, a replacement block mode, or a log block mode.

In the page mapping mode, data in the storage unit is stored in a unit of a logic page, and has a corresponding page mapping table. In the page mapping table, the logic page number is indexed, and a physical page number is the table entry (item content). When a storage system using the page mapping mode handles read and write commands, physical data pages can be addressed by directly querying and updating the page mapping table. In the block mapping mode, data in the storage unit is stored in a unit of a logic block, and has a corresponding block mapping table. In the block mapping table, the logic block number is an index, and a physical block number is the table entry. When a storage system using the block mapping mode handles read and write commands, physical data pages can be addressed by directly querying and updating the block mapping table. However, for a rewrite command, a physical block must be first allocated, so that the requested page may be written to the allocated physical block. Then, other pages belonging to the same logic block must be copied to the allocated physical block, which is very time consuming. Therefore, the replacement block mode is applied. In the replacement block mode, each logic block has a series of linked replacement blocks in addition to a physical data block. When a page is rewritten, the first empty replacement block is sought from the linked sequence. If the empty replacement block is found, data is written to a position corresponding to the page number in the replacement block. If no empty replacement block is found, a new replacement block is added to the end of the linked sequence, and data is written to a position corresponding to the page number in the new replacement block. In the log block mode, one or a predefined number of log blocks are allocated for one, several linked, or all logic blocks. The log blocks can be used to store data which was requested to be written to the logic blocks. When read and write commands are handled, a log block must be scanned to determine whether the corresponding logic block is clean (no data in the log block), or a page mapping table corresponding to the logic block is found.

Because of the characteristic of the flash memory that the unit for read/write is a page, and the unit for erase is a block, and data must be erased before write. Therefore, when a storage system using the block mapping mode handles a write command, the original physical data block must be erased once. Thus, write efficiency is lowed when the block size is increased. In the page mapping mode, the data distribution is complex. When no empty physical block can be used, the procedure of data merge for obtaining a new empty physical block is complicated. Additionally, with the development of IC manufacturing technology, the page/block size has been substantially increased. Further, respective pages in each block of a high capacity storage unit, such as a NAND flash memory, cannot be randomly written, but must be written in sequence. Obviously, the replacement mode, wherein the respective pages in a block must be written randomly can not be adapted. In the log block mode, only recent updated data pages may use the page mapping mode for saving the storage space of the page mapping table. Therefore, when the storage unit is required to be accessed, a specific table must be scanned to ensure whether the requested data is in the page mapping area, thus decreasing system efficiency. In some hybrid mapping modes, such as integrating the block mapping mode and the page mapping mode, similar to the log block mode, when the storage unit is required to be accessed, a specific table must be scanned to ensure whether the requested data is in the page mapping area. In the hybrid mapping modes, the area of page mapping must be limited to avoid a lengthy time being spent on the scanning procedure, thus decreasing system efficiency. However, if the area of page mapping is too small, it will be easily filled, and one or several data merges must be performed before handling other write commands, thus also decreasing system efficiency.

BRIEF SUMMARY OF THE INVENTION

One of the objectives of the invention is to provide mapping management methods and systems that obviate the disadvantages associated with those conventional mapping management methods mentioned before, and integrates the block mapping mode and the page mapping mode without scanning any specific table.

In an embodiment of a mapping management method, a sub-read command comprising mapping directory number, block offset and page offset is obtained. Then, a specific block mapping table is located from a plurality of block mapping tables according to the mapping directory number, and a first specific entry is located from the specific block mapping table according to the block offset, wherein the first specific entry comprises a mapping mode setting and block information. When the mapping mode setting indicates a page mapping mode, a second specific entry is located from a page mapped block table according to the block information, and a specific page mapping table is located corresponding to a specific page mapped block from a plurality of page mapping tables according to the second specific entry. Thereafter, a third specific entry is located from the specific page mapping table according to the page offset, and a page of data is located from a storage unit according to the third specific entry.

An embodiment of a mapping management system comprises a storage unit and a processing module. The storage unit stores data using at least one block comprising at least one page according to a page mapping mode or a block mapping mode. The processing module obtains a sub-read command comprising mapping number, block offset and page offset. The processing module locates a specific block mapping table from a plurality of block mapping tables according to the mapping number, and locates a first specific entry from the specific block mapping table according to the block offset, wherein the first specific entry comprises a mapping mode setting and block information. When the mapping mode setting indicates the page mapping mode, the processing module locates a second specific entry from a page mapped block table according to the block information, and locates a page mapping table corresponding to a specific page mapped block. The processing module then locates a third specific entry from the page mapping table according to the page offset, and locates a page of data from the storage unit according to the third specific entry.

Mapping management methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Mapping management methods and systems are provided.

Figure 1:
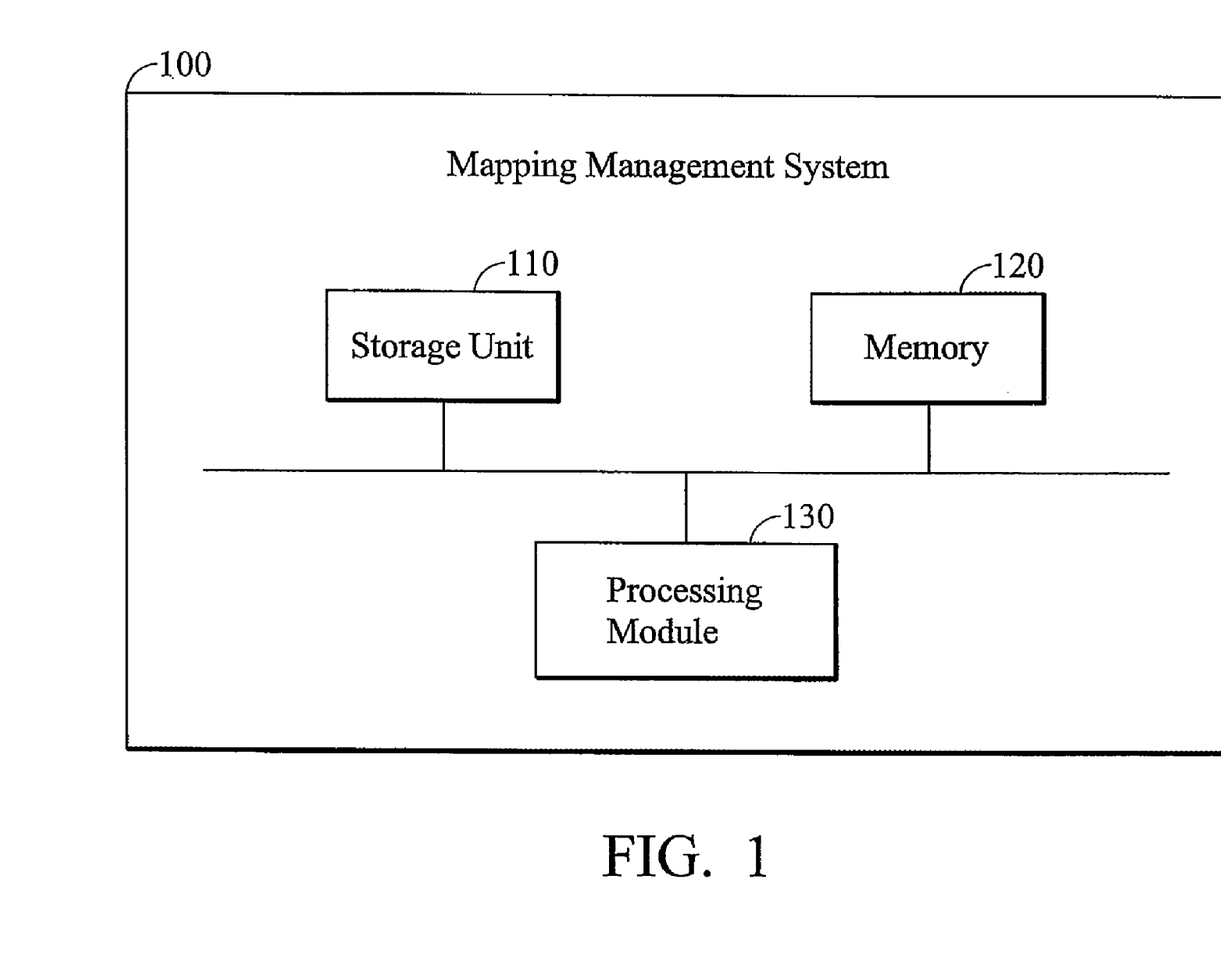
FIG. 1 is a schematic diagram illustrating an embodiment of a mapping management system according to the invention.

FIG. 1 is a schematic diagram illustrating an embodiment of a mapping management system according to the invention. The mapping management system 100 comprises a storage unit 110, a memory 120, and a processing module 130. The storage unit 110 may be a non-volatile memory, such as a NAND flash memory. Data in the storage unit 110 can be stored respectively using units of pages and blocks according to a page mapping mode or a block mapping mode. The storage unit 110 may also comprise a mapping directory (not shown), a plurality of block mapping tables (not shown), a plurality of page mapped block tables (not shown), and a plurality of page mapping tables (not shown), and related formats and use thereof are discussed later. The memory 120 is used to store the mapping directory, the page mapped block tables, and the page mapping tables loaded from the storage unit 110, and also used to buffer the block mapping tables which are least recently used when the system is powered on. The processing module 130 receives a read/write command from an upper layer, such as an application in the host, and decomposes the read/write command into at least one sub-read/write command in a unit of a page, and further converts the sub-read/write command with Logic Block Address (LBA) into a read/write command to access the physical block in the storage unit 110 according to the mapping directory, the block mapping table, the page mapped block table, and the page mapping table, which are further explained later.

Figure 2:
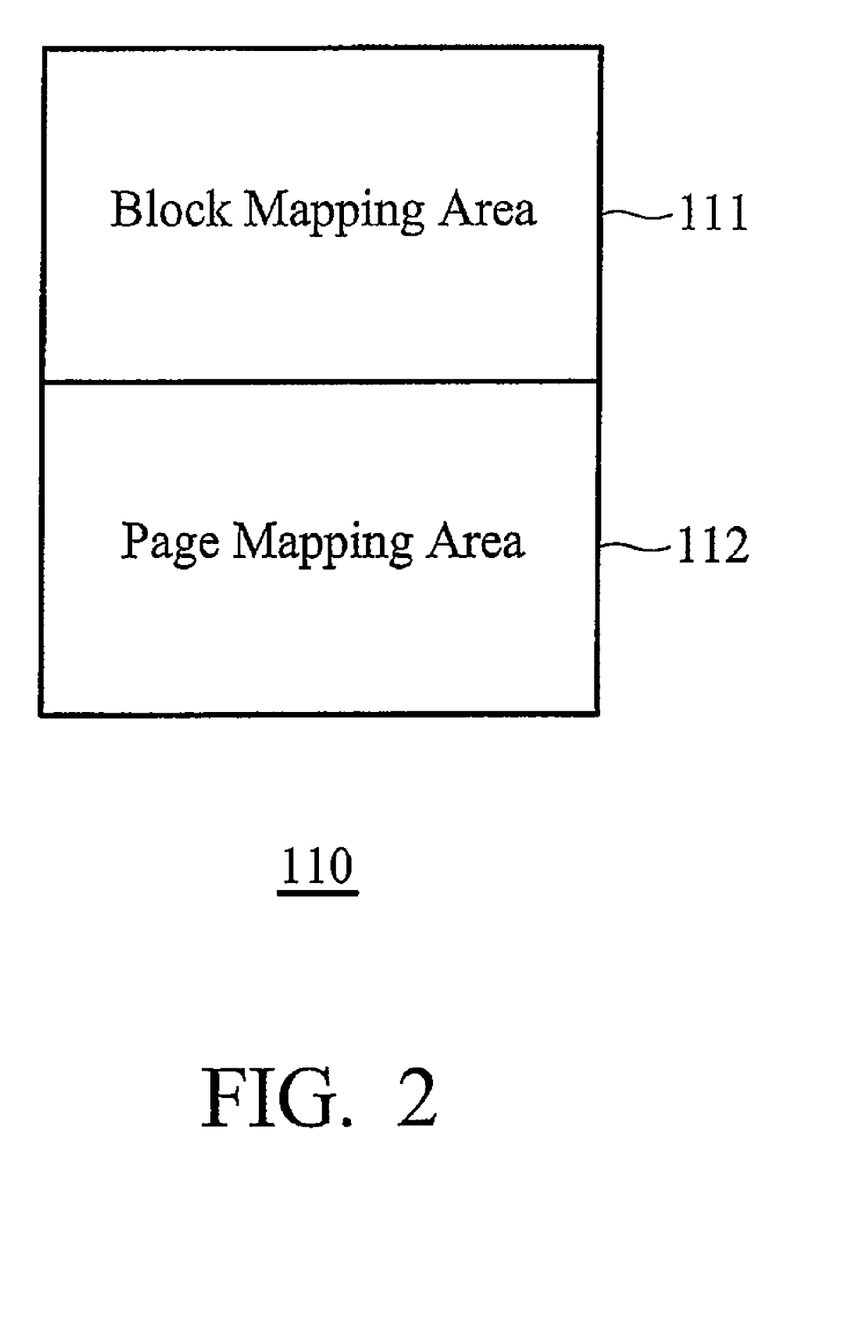
FIG. 2 is a schematic diagram illustrating an embodiment of a storage unit according to the invention.

FIG. 2 is a schematic diagram illustrating an embodiment of a storage unit according to the invention. The storage unit 110 comprises a block mapping area 111 and a page mapping area 112. The block mapping area 111 and the page mapping area 112 are both composed of logic blocks. When a logic block in the block mapping area 111 is rewritten, the logic block becomes a part of the page mapping area 112. That is the logic block becomes a page mapping block having a page mapping table. When a logic block satisfies a predefined condition, a merge or switch procedure may be performed on the logic block, so that the logic block becomes a block mapping block of the block mapping area 111. For example, if all pages of a logic block in the page mapping area 112 after the merge procedure are sequentially stored with data, the block would then become a logic block in the block mapping area 111. It is understood that the number of blocks stored with data based on the page mapping mode, which means the size of the page mapping area 112 is determined according to the size of the memory 120. If the memory 120 is bigger, the size of the page mapping area 112 may be bigger. It is understood that, in some embodiments, the page mapping area 112 may be big enough to cover hot data frequently accessed by main programs, such as operating systems, for example, Windows and Linux systems. In this manner, the hot data can be always stored using the page mapping mode, thus avoiding data merges due to high hot data writing frequency. Additionally, when cold data infrequently accessed is written to a block, the block can be easily returned to the block mapping area 111 using data merge cause the block rarely needs to be rewritten.

The content of the mapping directory, the block mapping table, the page mapped block table, and the page mapping table are discussed as follow.

Figure 3:
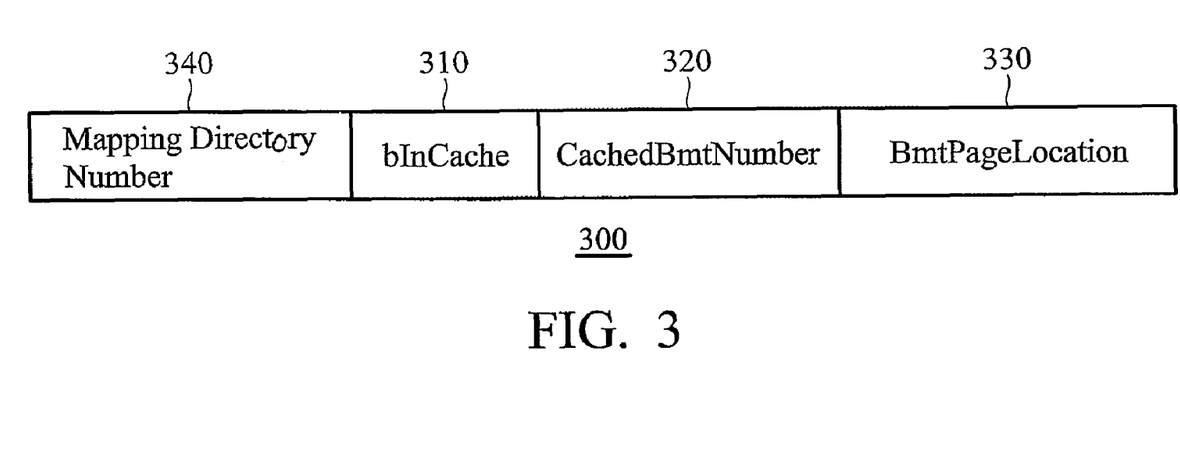
FIG. 3 is a schematic diagram illustrating an embodiment of an entry format of a mapping directory according to the invention.

FIG. 3 is a schematic diagram illustrating an embodiment of an entry format of a mapping directory according to the invention. The mapping directory comprises several such entries. The mapping directory is a root directory mapping user data. A mapping directory number (MDN) can be used as an index for the entries in the mapping directory, and each entry points to a page (block mapping table page) of a part of the block mapping tables corresponding to a predefined size, such as 256 MB of user data. As shown in FIG. 3, a mapping directory entry 300 comprises a 'MappingDirectoryNumber' field 340, a 'bInCache' field 310, a 'CachedBmtNumber' field 320, and a 'BmtPageLocation' field 330. The 'MappingDirectoryNumber' field 340 records a mapping directory number used as an index for the entry 300. The 'bInCache' field 310 indicates whether a corresponding block mapping table page has been loaded in the memory 120 from the storage unit 110. For example, when the block mapping table page has been loaded in the memory 120, the 'bInCache' field 310 records '1'. And when the block mapping table page has not been loaded in the memory 120, the 'bInCache' field 310 records '0'. For the block mapping table page that has been loaded in the memory 120, the 'CachedBmtNumber' field 320 records an address of the block mapping table page in the memory 120. For the block mapping table page that has not been loaded in the memory 120, the 'CachedBmtNumber' field 320 records 'Invalid', and the physical address of the block mapping table page in the storage unit 110 is recorded in the 'BmtPageLocation' field 330.

Figure 4:
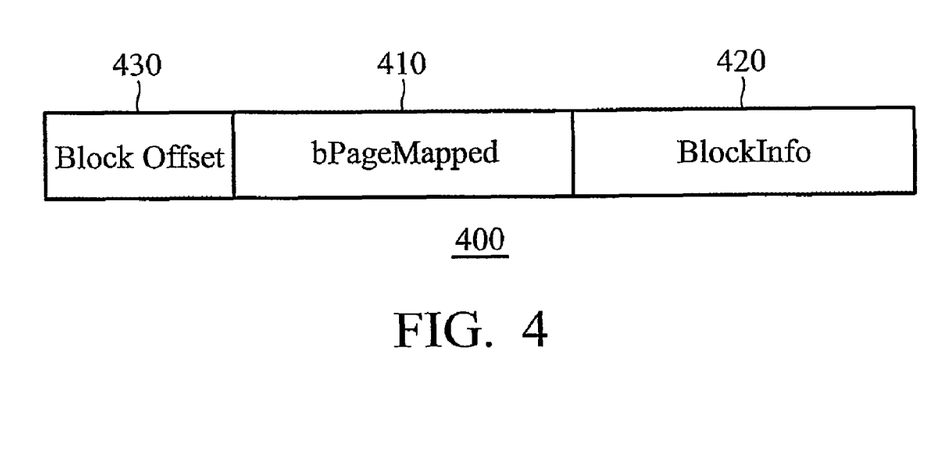
FIG. 4 is a schematic diagram illustrating an embodiment of an entry format of a block mapping table according to the invention.

FIG. 4 is a schematic diagram illustrating an embodiment of an entry format of a block mapping table according to the invention. The block mapping table comprises several such entries. A logic block offset can be used as an index for the entries in the block mapping table, wherein each entry can record storage location information corresponding to the logic block. As shown in FIG. 4, a block mapping table entry 400 comprises a 'BlockOffset' field 430, a 'bPageMapped' field 410 and a 'BlockInfo' field 420. The 'BlockOffset' field 430 records a block offset as an index for the entry 400. As described above, data in the storage unit 110 can be accessed using the block mapping mode or the page mapping mode. Therefore, the 'bPageMapped' field 410 is used to indicate the mapping mode used by a logic block that owns the block mapping table. For example, when the logic block uses the block mapping mode, the 'bPageMapped' field 410 records '0'. When the logic block uses the page mapping mode, the 'bPageMapped' field 410 records '1'. The 'BlockInfo' field 420 records detailed mapping information. For the logic block using the block mapping mode, the 'BlockInfo' field 420 records the physical location, such as a physical block number corresponding to a data block. For the logic block using the page mapping mode, the 'BlockInfo' field 420 records a page mapped block number, that indicates which of the page mapped blocks, is the logic block.

Figure 5:
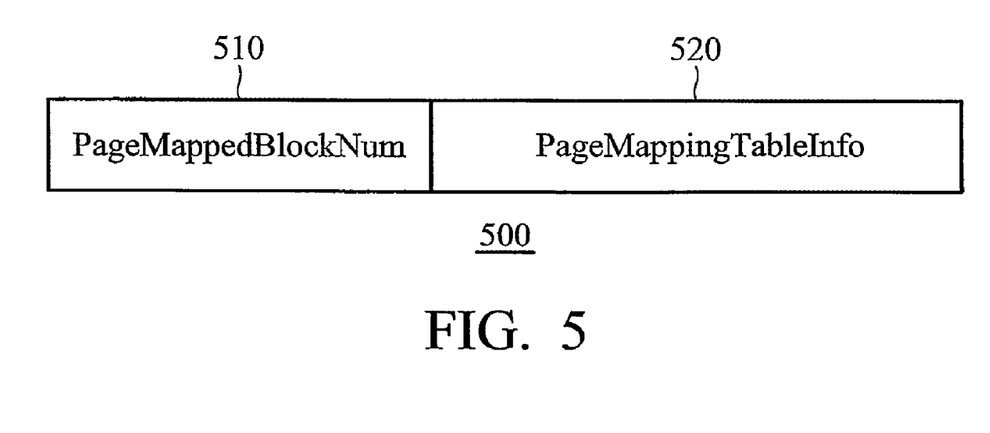
FIG. 5 is a schematic diagram illustrating an embodiment of an entry format of a page mapped block table according to the invention.

FIG. 5 is a schematic diagram illustrating an embodiment of an entry format of a page mapped block table according to the invention. The page mapped block table comprises several such entries. A page mapped block number can be used as an index for the entries in the page mapped block table, and each entry can record a beginning address of a page mapping table corresponding to the logic block in the memory 120. As shown in FIG. 5, a page mapped block table entry 500 comprises a 'PageMappedBlockNum' field 510 and a 'PageMappingTableInfo' field 520. The 'PageMappedBlockNum' field 510 records the page mapped block number, which is corresponding to the data recorded in the 'BlockInfo' field 420 of the block mapping table entry 400 when the logic block using the page mapping mode. And the 'PageMappingTableInfo' field 520 records a beginning address of a page mapping table corresponding to the logic block in the memory 120.

Figure 6:
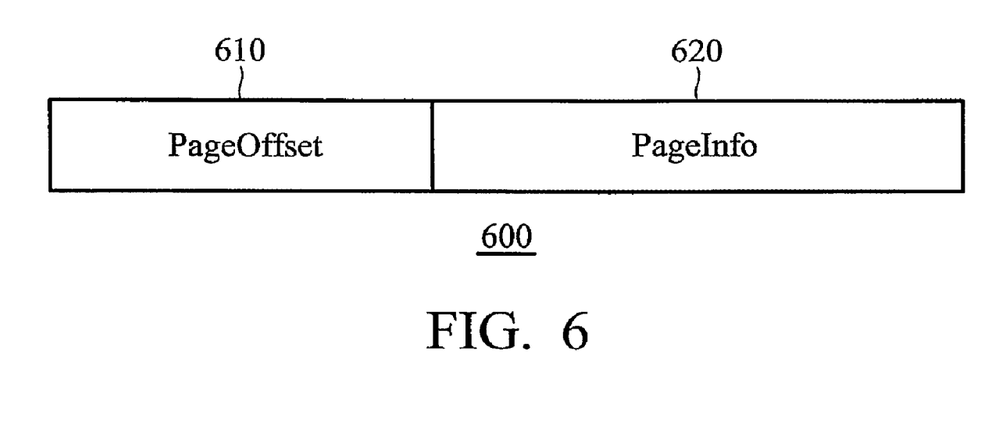
FIG. 6 is a schematic diagram illustrating an embodiment of an entry format of a page mapping table according to the invention.

Every page mapped block owns a page mapping table, which is addressed by the 'PageMappingTableInfo' field 520. FIG. 6 is a schematic diagram illustrating an embodiment of an entry format of a page mapping table according to the invention. The page mapping table comprises several such entries. A page offset can be used as an index for the entries in the page mapping table, and each entry can record a physical storage location, such as a device number, a physical block number, and a physical page offset of a logic page corresponding to the page mapped logic block. As shown in FIG. 6, a page mapping table entry 600 comprises a 'PageOffset' field 610 and a 'PageInfo' field 620. The 'PageOffset' field 610 records the page offset as an index, and the 'PageInfo' field 620 records a physical storage location of the logic page corresponding to the logic block. It is noted that, in some embodiments, the number of entries in the page mapping table equals to the number of pages contained in a logic block.

Figure 7:
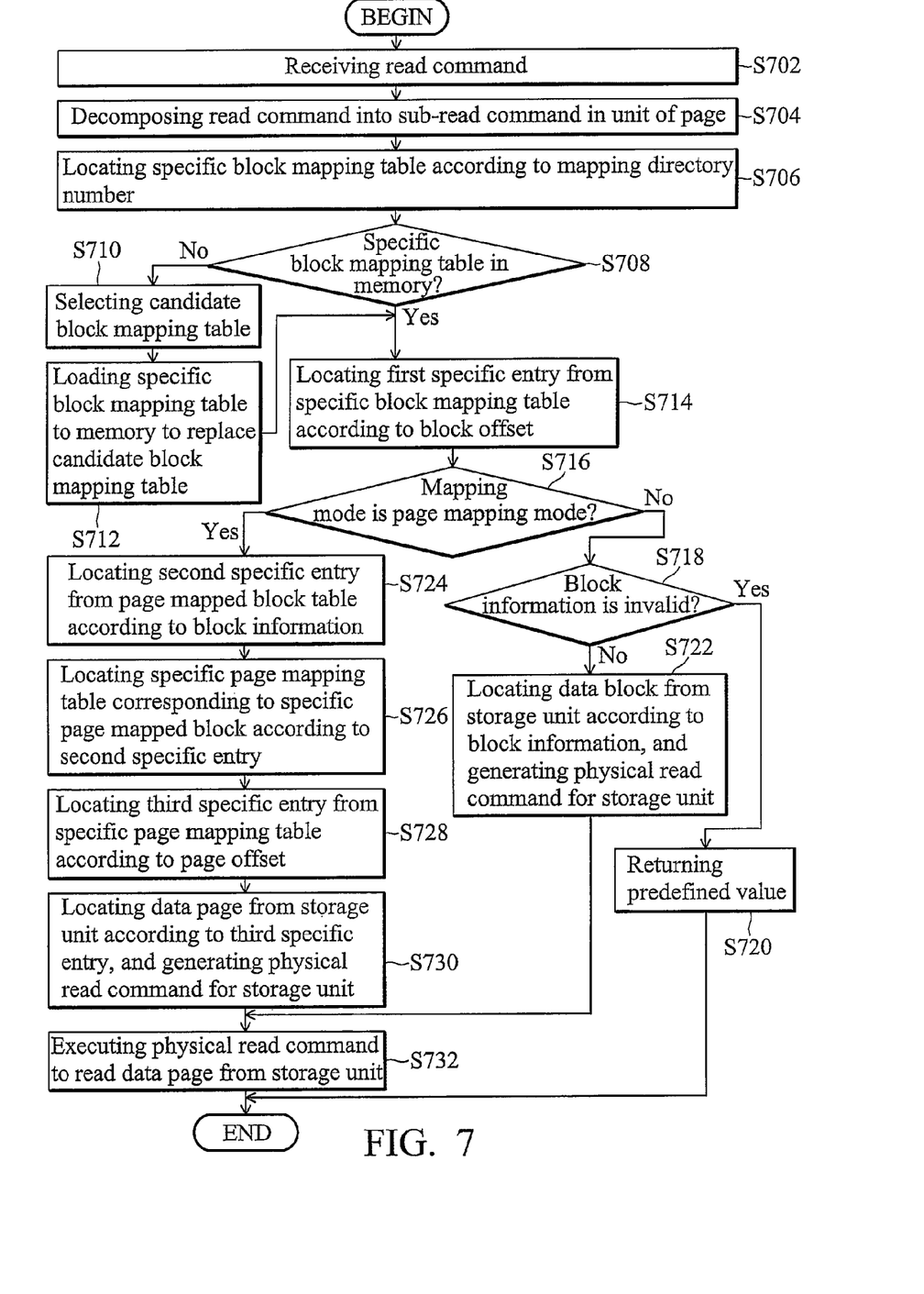
FIG. 7 is a flowchart of an embodiment of a mapping management method according to the invention.

FIG. 7 is a flowchart of an embodiment of a mapping management method according to the invention.

Figure 8:
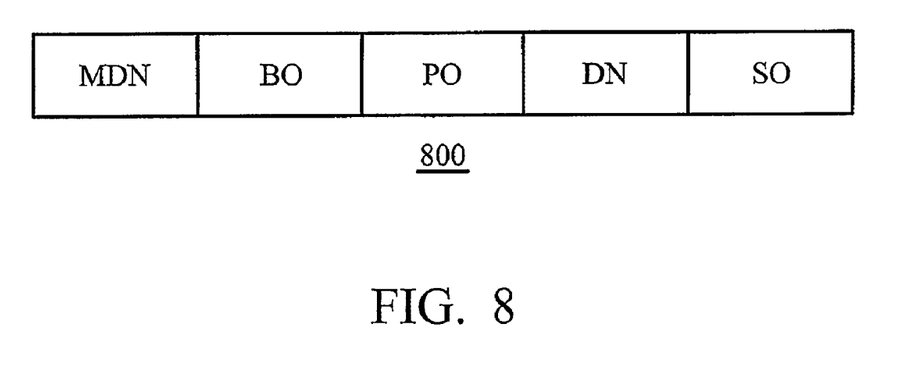
FIG. 8 is a schematic diagram illustrating an embodiment of a format of a read command according to the invention.

In step S702, a read command is received from an upper layer, such as an application, and in step S704, the received read command is decomposed into at least one sub-read command in the unit of page. The sub-read command may embody a Logic Block Address (LBA) comprising mapping directory number, block offset, page offset, device number, and/or a sector offset. FIG. 8 is a schematic diagram illustrating an embodiment of a format of a Logic Block Address (LBA) embodied in the sub-read command according to the invention. As shown in FIG. 8, the Logic Block Address (LBA) 800 comprises an 'MDN' field, a 'BO' field, a 'PO' field, a 'DN' field, and an 'SO' field, wherein the 'MDN' field records the mapping directory number, the 'BO' field records the block offset, the 'PO' field records the page offset, the 'DN' field records the device number, and the 'SO' field records the sector offset. In step S706, a specific block mapping table is located from a plurality of block mapping tables of the mapping directory according to the mapping directory number in the LBA 800. In step S708, it is determined whether the specific block mapping table is in the memory. It is noted that, the determination in step S708 can be performed according to the data in the 'bInCache' field 310 of the entry 300 corresponding to the mapping directory number in the LBA 800. If the specific block mapping table is not in the memory (No in step S708), in step S710, a candidate block mapping table is selected from the block mapping tables in the memory, and in step S712, the specific block mapping table is loaded to the memory to replace the candidate block mapping table. It is understood that, in some embodiments, the selection of the candidate block mapping table is performed only when there is not enough memory space, and the candidate block mapping table is selected according to an LRU (Least Recently Used) algorithm. If the memory still has available space, the specific block mapping table can be directly loaded to the memory. After loading the specific block mapping table, then go to step S714.

If the specific block mapping table is in the memory (Yes in step S708), also go to step S714. In step S714, a first specific entry (e.g. a block mapping table entry 400) is located from the specific block mapping table according to the block offset in the LBA 800. The first specific entry comprises a mapping mode setting (data in the 'bPageMapped' field 410) and block information (data in the 'BlockInfo' field 420). In step S716, it is determined whether the mapping mode corresponding to the block is the page mapping mode according to the mapping mode setting. If the mapping mode is the block mapping mode (No in step S716), then go to step S718. In step S718, it is determined whether the block information (data in the 'BlockInfo' field 420) recorded in the first specific entry is invalid. In some embodiments, the determination in step S718 can be performed by determining whether the block information is a specific value, such as −1. If the block information is invalid (Yes in step S718), then in step S720, a predefined value, such as 0 is directly returned. If the block information is not invalid (No in step S718), then in step S722, a data block is located from the storage unit according to the block information in the first specific entry (e.g. a block mapping table entry 400), and a physical read command for the storage unit is generated according to the LBA 800 in the sub-read command and the block information (a physical block position in the 'BlockInfo' field 420). Then, in step S732, the physical read command is executed to read the data page in the located data block from the storage unit.

If the mapping mode is the page mapping mode (Yes in step S716), in step S724, a second specific entry (e.g. a page mapped block table entry 500) is located from a page mapped block table according to the block information (page mapped block number in the 'BlockInfo' field 420) in the first specific entry, and in step S726, a specific page mapping table corresponding to a specific page mapped block is located from a plurality of page mapping tables according to the second specific entry. In step S728, a third specific entry (e.g. a page mapping table entry 600) is located from the specific page mapping table according to the page offset in the LBA 800. The third specific entry records the physical storage location (data in the 'PageInfo' field 620) of the logic page of the specific page mapped block. In step S730, a data page is located from the storage unit according to the third specific entry (e.g. a page mapping table entry 600), and a physical read command for the storage unit is generated according to the LBA 800 in the sub-read command and the page information (data in the 'PageInfo' field 620) of the third specific entry. Then, in step S732, the physical read command is executed to read the located data page from the storage unit. It is understood that, as described, the LBA 800 in the sub-read command may further comprise the device number and/or the sector offset. When the LBA 800 comprises the device number and/or the sector offset, the data page can be located from the storage unit according to the third specific entry (e.g. a page mapping table entry 600) and the device number and/or the sector offset Therefore, the mapping management methods and systems of the application can integrate the block mapping mode and the page mapping mode, and avoid scanning of a specific table, thus maintaining system efficiency.

Mapping management methods and systems, or certain aspects or portions thereof, may take the form of a software translation layer used between the file system of the host and the non-volatile memory (i.e., program code) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mapping management method, comprising:
  obtaining a sub-read command, wherein the sub-read command is constructed by a mapping directory number, a block offset and a page offset;
  locating a specific block mapping table from a plurality of block mapping tables according to the mapping directory number, wherein each of the plurality of block mapping tables comprises a plurality of first entries corresponding to a plurality of block offsets;
  locating a first specific entry from the specific block mapping table according to the block offset, wherein the first specific entry comprises a mapping mode setting and block information, and the mapping mode setting indicates a mapping mode used by a block that owns the specific block mapping table is a page mapping mode or a block mapping mode; and
  when the mapping mode setting indicates the page mapping mode,
  locating a second specific entry from a page mapped block table according to the block information of the first specific entry,
  and locating a specific page mapping table corresponding to a specific page mapped block from a plurality of page mapping tables according to the second specific entry, and
  locating a third specific entry from the specific page mapping table according to the page offset, and
  locating a data page from a storage unit according to the third specific entry,
  wherein the second specific entry records a beginning address of the specific page mapping table.

2. The method of claim 1, further comprising when the mapping mode setting indicates the block mapping mode, directly locating a data block from the storage unit according to the block information.

3. The method of claim 2, wherein when the mapping mode setting indicates the block mapping mode, the method further comprises the steps of:
  determining whether the block information is invalid; and
  when the block information is invalid, directly returning a predefined value.

4. The method of claim 1, when the mapping mode setting indicates the page mapping mode, the block information comprising a page mapped block number, and the page mapped block table is indexed by the page mapped block number.

5. The method of claim 1, wherein the sub-read command is in the unit of page decomposed from a received read command.

6. The method of claim 1, further comprising:
  determining whether the specific block mapping table is in a memory according to the mapping directory number; and
  when the specific block mapping table is not in the memory, selecting a candidate block mapping table from the block mapping tables in the memory; and loading the specific block mapping table to the memory to replace the candidate block mapping table.

7. The method of claim 6, wherein the candidate block mapping table is selected according to an LRU (Least Recently Used) algorithm.

8. The method of claim 1, further comprising:
  converting the sub-read command into at least one physical read command for the storage unit according to the third specific entry; and
  executing the physical read command to read the data page from the storage unit.

9. The method of claim 1, wherein the sub-read command further comprises device number or sector offset, and the data page is located from the storage unit according to the second specific entry and the device data or the sector data.

10. The method of claim 1, wherein the storage unit comprises a non-volatile memory.

11. The method of claim 1, wherein the number of blocks that store data in the page mapping mode in the storage unit is determined according to the size of the memory.

12. A mapping management system, comprising:
  a storage unit storing data using at least one block comprising at least one page according to a page mapping mode or a block mapping mode; and a processing module obtaining a sub-read command constructed by a mapping directory number, a block offset and a page offset, locating a specific block mapping table from a plurality of block mapping tables according to the mapping directory number, and locating a first specific entry from the specific block mapping table according to the block offset, wherein the first specific entry comprises a mapping mode setting and block information, the mapping mode setting indicates a mapping mode used by the at least one block that owns the specific block mapping table is the page mapping mode or the block mapping mode, and when the mapping mode setting indicates the page mapping mode, locating a second specific entry from a page mapped block table according to the block information of the first specific entry, locating a page mapping table corresponding to a specific page mapped block from a plurality of page mapping tables according to the second specific entry, locating a third specific entry from the page mapping table according to the page offset and locating a page of data from the storage unit according to the third specific entry, wherein each of the plurality of block mapping tables comprises a plurality of first entries corresponding to a plurality of block offsets and the second specific entry records a beginning address of the specific page mapping table.

13. The system of claim 12, wherein when the mapping mode setting indicates the block mapping mode, the processing module further directly locates a data block from the storage unit according to the block information.

14. The system of claim 13, wherein when the mapping mode setting indicates the block mapping mode, the processing module further determines whether the block information is invalid, and when the block information is invalid, directly returns a predefined value.

15. The system of claim 14, wherein when the mapping mode setting indicates the page mapping mode, the block information comprising a page mapped block number, and the page mapped block table is indexed by the page mapped block number.

16. The system of claim 12, wherein the sub-read command is in the unit of page decomposed from a received read command.

17. The system of claim 12, wherein the processing module further determines whether the specific block mapping table is in a memory according to the mapping directory number, and when the specific block mapping table is not in the memory, selects a candidate block mapping table from the block mapping tables in the memory, and loads the specific block mapping table to the memory to replace the candidate block mapping table.

18. The system of claim 17, wherein the candidate block mapping table is selected according to an LRU (Least Recently Used) algorithm.

19. The system of claim 12, wherein the processing module further converts the sub-read command into at least one physical read command for the storage unit according to the third specific entry, and executes the physical read command to read the data page from the storage unit.

20. The system of claim 12, wherein the sub-read command further comprises device number or sector offset, and the processing module locates the data page from the storage unit according to the second specific entry and the device number or the sector offset.

21. The system of claim 12, wherein the storage unit comprises a non-volatile memory.

22. The system of claim 12, wherein the number of blocks that store data in the page mapping mode in the storage unit is determined according to the size of the memory.

* * * * *